United States Patent Office 3,398,169
Patented Aug. 20, 1968

3,398,169
PRODUCTION OF HALOGEN CONTAINING ORGANOTIN COMPOUNDS
Wilhelm Paul Neumann, Giessen (Lahn), and Josef Alfred Pedain, Hungen, Upper Hesse, Germany, assignors to Studiengesellschaft Kohle m.b.H., Mulheim (Ruhr), Germany
No Drawing. Filed July 8, 1965, Ser. No. 470,554
Claims priority, application Germany, July 10, 1964, St 22,385
9 Claims. (Cl. 260—429.7)

ABSTRACT OF THE DISCLOSURE

The production of halogen-containing organotin compounds by the reaction of organotin halide hydrides or mixed organotin halides and hydrides with an organic compound containing an unsaturated grouping, such as an olefinic double bond and acetylene triple bond, or a carbonyl double bond.

---

This invention relates to the production of halogen-containing organotin compounds.

Almost all of the organotin compounds which have gained commercial importance up to the present are included in the classes $R_3SnX$ or $R_2SnX_2$ or are prepared therefrom by further syntheses. In the formulae given above, R is preferably a straight-chain or branched-chain aliphatic or aromatic radical and X is a halogen, especially chlorine or bromine. As is known, the preparation is possible satisfactorily if only identical R radicals are bonded to tin. However, this is not applicable if different radicals are to be linked or if one of the R radicals bears a functional group, which is advantageous for the further use, e.g., the incorporation into polymers. In this case, it is first necessary to prepare a suitable tetraalkyl tin, e.g., by hydrostannation of an olefin:

$$R_3SnH + H_2C{=}CH{-}R' \rightarrow R_3Sn{-}CH_2{-}CH_2{-}R'$$

(R' contains the functional group desired), and then one or two of the alkyl groups must be replaced by halogen in another operational step, e.g., according to the following equation:

$$R_3Sn{-}CH_2{-}CH_2{-}R' + X_2 \rightarrow R_2Sn(X)CH_2{-}CH_2{-}R' + RX$$

This is only possible with specific alkyl groups and the yields are unsatisfactory in many cases. This process has the further fundamental disadvantage that an R radical which is already bonded to the tin is lost again.

It is an object of the present invention to provide a novel process permitting the preparation of these halogen-containing organotin compounds in a very much easier and more rapid manner and with higher yields. Thus, in accordance with the invention, a process for the production of organotin compounds by addition of organotin halide hydrides to compounds containing unsaturated groupings is provided. In particular, it has been found that halogen-containing organotin compounds containing different R radicals which may especially also contain functional groups may be prepared smoothly and with good yields by adding alkyl, aryl and/or aralkyl tin halide hydrides of the general formulae $R_2Sn(X)H$, $RSn(X)H_2$ or $RSN(X_2)H$ to the compounds containing unsaturated groupings.

Suitable compounds having unsaturated groupings are those where two atoms are linked by Pi electrons in addition to being linked by sigma electrons. These are especially understood to be compounds containing terminal and internal olefinic and alkyne groups, ketones, aldehydes, azomethyne and azo compounds. In accordance with the invention, the organotin halide hydride adds itself with its SnH group to the unsaturated grouping. Thus, using the type $R_2Sn(X)H$ as an example, there results inter alia (R' and R" are any organic groups):

$$R_2Sn(X)H + H_2C{=}CH{-}R'$$
$$R_2Sn(X)H + R'{-}CH{=}CH{-}R''$$
$$R_2Sn(X)H + HC{\equiv}C{-}R'$$
$$R_2Sn(X)H + O{=}CR'{-}R''$$
$$R_2Sn(X)H + R'{-}CH{=}N{-}R''$$
$$R_2Sn(X)H + R'{-}N{=}N{-}R''$$
$$R_2Sn(X)CH_2{-}CH_2{-}R'$$
$$R_2Sn(X)CH(R')CH_2{-}R_2''$$
$$R_2Sn(X)CH{=}CH{-}R'$$
$$R_2Sn(X)O{-}CHR'R''$$
$$(R'{=}H \text{ or alkyl})$$
$$R_2Sn(X)N(R'')CH_2{-}R'$$
$$R_2Sn(X)N(R'')NH{-}R'$$

Preferred R radicals in the organotin compounds used in accordance with the invention are especially straight-chain and branched-chain alkyl radicals having from 1 to 8 carbon atoms and simple aromatic radicals such as phenyl and its derivatives.

Reactions such as those described above are known up to the present only with tin hydrides of the types $R_3SnH$ and $R_2SnH_2$. In contrast to this known reaction, it has been found surprisingly that the organotin halide hydrides have a far higher reactivity so that they react smoothly with most of the co-reactants at temperatures as low as room temperature or slightly above room temperature. Preferred are temperatures up to a maximum of 50° C.

It has also been found that the mechanism of the additions described above is generally a radical mechanism so that, if necessary at all, they can be catalyzed by radical formers which are decomposed into radicals at the low reaction temperatures ranging especially up to 50° C. Of course, common radical formers such as azo-bis (isobutyronitrile) are preferred. Other examples hereof are benzyl hyponitrite and azo-bis(isobutyric acid methyl ester) or the corresponding diethyl ester.

The process of the invention and its results are surprising in several respects. As may be seen from literature, organotin halide hydrides could not be obtained so far as pure substances. The process of the invention can also dispense with their preparation in pure form, this process rather involving mixing appropriate amounts of dihydride and dihalide thereby forming the halide hydride in equilibrium (X=halogen):

$$R_2SnX_2 + R_2SnH_2 \rightleftharpoons 2R_2Sn(X)H$$

When heating under vacuum, the most volatile dihydride distils and is completely recovered. Thus, the equilibrium is shifted to the left hand side:

$$2RSnX_3 + RSnH_3 \rightleftharpoons 3RSn(X_2)H$$
$$RSnX_3 + 2RSnH_3 \rightleftharpoons 3RSn(X)H_2$$

The trihydride may be replaced completely or in part by equivalent amounts of a di- or monohydride. It is found that the reactivity of the halide hydrides as compared with unsaturated compounds is superior to an extent such that conceivable competing reactions which are initially expected by the skilled artisan are generally undetectable. This is especially true for the initially expected addition of the halogen-free organotin hydrides present in the reaction mixture to the unsaturated compounds. The result is that the hydride mixtures described above generally behave in the process of the invention as though actually exclusively the halide hydride desired would be present.

Furthermore, the smooth reaction of the halide hydrides is surprising because it was to be expected that they are rather sensitive to heat. However, due to the high reactivity, the additions proceed at a rate sufficiently high that decompositions cannot be detected within the short reaction time. However, these decompositions will occur if the reaction mixture will be heated unnecessarily to about 60° C. and more. It is favorable to prepare the mixture of organotin hydride and organotin halide only shortly before use and to protect it from the action of direct sun light.

Solvents are not necessary in general but are not disadvantageous. They may be advantageous if the reactants do not mix completely with one another or would react too vigorously.

The order of contacting the reactants, i.e., organotin hydride, organotin halide and unsaturated compound is not critical. In general, the latter is added to the freshly prepared mixture of hydride and halide. It is also possible to mix the halide with the unsaturated compound and then add the hydride dropwise.

It is sufficient in general to use a stoichiometrical amount of the unsaturated compound. An excess is not detrimental and may be advantageous in certain cases and also undertake the function of a solvent or diluent.

Due to the sensitivity of organotin hydrides and organotin halide hydrides to air and other oxidants, it is desirable to exclude these. This may be accomplished, for example, with the use of nitrogen or another agent which is not reactive in the present process.

The practice of the invention and the advantages to be obtained therefrom will be better understood and appreciated in view of the following specific examples which should be considered as illustrative only and in no sense limitive of the scope of the present invention.

EXAMPLE 1

To 10.7 g. of diisobutyl tin dihydride and 13.82 g. of diisobutyltin-dichloride there are added 9.64 g. of acrylonitrile and then 40 mg. of azo-bis(isobutyrodinitrile) (AIBN) as catalyst. The mixture becomes warm and the reaction is completed after 5 minutes (Sn—H band no longer detectable in the IR spectrum). Yield after fractionation, 26.2 g. (89% of the theory) of $(iC_4H_9)_2Sn(Cl)—CH_2—CH_2—Cn$ B.P., 107° C./0.06 mm. Hg; $n_D^{20}=1.5157$; molecular weight: calculated, 323; found, 330; Cl, calculated 10.98%, found 10.95%. In case of larger batches, care should be taken by cooling or gradual combination of the reactants that the internal temperature will not exceed 50° C.

EXAMPLE 2

15 g. of diethyltin dihydride, 28.3 g. of diethyltin-dibromide and 18.14 g. of acrylonitrile give 46.5 g. (89% of theory) $(C_2H_5)_2Sn(Br)CH_2—CH_2—CN$, B.P. 119° C./0.7 mm. Hg, 38.2% Sn, 25.6% Br; calculated, 38.2% and 25.7%, respectively, in an exothermic reaction without a catalyst. The actual yield is quantitative because the amount missing to give 100% is lost only in the working-up. Better final yields are obtained with larger batches.

EXAMPLE 3

From 17 g. of diphenyltin dihydride, 21.3 g. of diphenyltin-dichloride and 29.1 g. of α-methyl styrene, there are obtained in an exothermic reaction which is completed after 20 minutes 46.1 g. (87% of the theory) of $(C_6H_5)_2Sn(Cl)—CH_2—CH—(CH_3)—C_6H_5$ as a colorless oil. 27.6% Sn, 8.4% Cl; calculated, 27.7% and 8.3%, respectively. The analogous di-p-tolyl compound is obtained when using equivalent amounts of di-p-tolyl-tin dichloride and di-p-tolyl-dihydride.

EXAMPLE 4

From 30 g. of diethyltin dihydride, 41.6 g. of diethyltin-dichloride and 60 g. of hexadiene-(1.5) there are obtained at 30–40° C. with little azo-bis(isobutyrodimethyl ester) and after having driven off excess hexadiene 92.5 g. (94% of the theory of $(C_2H_5)_2Sn(Cl)—(CH_2)_4—CH=CH_2$; B.P. 85° C./0.5 mm. Hg; $n_D^{20}=1.5091$; 40.1% Sn; calculated, 40.2%.

EXAMPLE 5

When repeating the procedure described above except that only 13.8 g. of hexadiene-(1.5) are used, there are obtained after processing 76.3 g. (90% of the theory) of $(C_2H_5)_2Sn(Cl)—(CH_2)_6—Sn(Cl)—(C_2H_5)_2$ M.P. 46° C. (from petroleum ether); 46.8% Sn, 13.8% Cl; calculated, 46.7% and 13.9%, respectively.

EXAMPLE 6

In an exothermic reaction, 16.67 g. of di-n-butyltin dihydride are reacted with 21.6 g. of dibutyltin-dichloride and 29.0 g. of ethylene glycol-monoallyl ether (40 mg. AIBN). The yield after fractional distillation is 49.3 g. (93% of the theory) of $(nC_4H_9)_2SnCl—(CH_2)_3—O—(CH_2)_2—OH$ B.P. 151° C./0.3 mm. Hg; $n_D^{20}=1.5103$; 9.6% Cl; calculated, 9.6% Cl.

The corresponding dioctyl compound is obtained in an analogous manner as a colorless oil when using equivalent amounts of di-n-octyltin-dichloride and di-n-octyltin-dihydride. An analogous result is obtained when using equivalent amounts of di-iso-octyltin-dichloride and di-iso-octyl-dihydride. The reaction time is somewhat longer in this case.

EXAMPLE 7

In an exothermic reaction which is completed within a few minutes and carried out with little AIBN, 5.83 g. of diisobutyltin dihydride, 7.60 g. of diisobutyltin-dichloride and 5.81 g. of allyl alcohol give $(isoC_4H_9)_2Sn(Cl)—(CH_2)_3—OH$ in a yield of 15.6 g. (95% of the theory) after fractional distillation. B.P. 152° C./0.4 mm. Hg; $n_D^{20}=1.5162$; 10.6% Cl; calculated, 10.8% Cl.

EXAMPLE 8

11.9 g. of diisobutyltin dihydride and 15.4 g. of diisobutyltin-dichloride react with 9.63 g. of acrylic acid methyl ester (plus little AIBN) instantaneously and exothermally. (The temperature may, if desired or necessary, be maintained below 50° C. by cooling.) The yield is 32.8 g. or 89% of the theory of $(isoC_4H_9)_2Sn(Cl)—CH_2—CH_2—COOCH_3$ B. P. 111° C./0.3 mm. Hg; $n_D^{20}=1.4982$; 33.2% Sn, 10.2% Cl; calculated, 33.4% and 10.0%, respectively.

The analogous bromide is obtained in a very similar manner by using the equimolar amount of the dibromide in place of the dichloride.

EXAMPLE 9

11.9 g. of diisobutyltin dihydride, 15.1 g. of diisobutyltin-dichloride, 16.5 g. of ethyl crotonate and 50 mg. of AIBN give at 50° C. (5 hours) and after fractional distillation 34 g.=90% of the theory of $(isoC_4H_9)_2Sn(Cl)—CH(CH_3)—CH_2—COOC_2H_5$ $n_D^{20}=1.4942$; 31.2% Sn; calculated, 31.0% Sn.

EXAMPLE 10

Equal amounts of the dihydride and dichloride mentioned above are reacted with 19.6 g. of phenyl acetylene without the use of a catalyst (exothermic reaction). The yield is 33.9 g.=92% of theory; B.P. 120° C./0.4 mm. Hg; 31.8% Sn, calculated 31.9% Sn.

The p-methoxy derivative is formed in an analogous manner from p—$CH_3O$—$C_6H_4O\equiv OH$. Furthermore, $CH_3OCH=CH-C\equiv CH$ and $NC-C\equiv CH$ were reacted in the same manner and with the same success. An analogous result is obtained when using equivalent amounts of dimethyltin dihydride and dimethyltin-dichloride in place of the iso-butyl compounds mentioned above. The reaction is then carried out advantageously between 0° C. and 20° C.

EXAMPLE 11

To 19.4 g. of ethyltin tribromide and 25.5 g. of phenyl acetylene there are added dropwise without a catalyst 14.55 g. of triisobutyltin hydride. Clarifying by filtration, if necessary, and fractional distillation give 15 g.=73% of the theory of $C_2H_5Sn(Br_2))CH=CH-C_6H_5$; B.P. 115° C./0.07 mm. Hg; M.P. 21° C.; 29.3% Sn; calculated, 28.9% Sn.

EXAMPLE 12

To 19.6 g. of cyclohexanone there is added dropwise with cooling with ice a mixture of 8.9 g. of diethyltin dihydride and 12.4 g. of diethyltin-dichloride. Distilling excess cyclohexanone and recrystallization from petroleum ether give 28 g. (90% of the theory) of $$(C_2H_5)_2Sn(Cl)-O-C_6H_{11}$$

M.P. 42° C. During the reaction, 50 mg. of dry zinc chloride may be present. When using the equivalent amount of methylethyl ketone in place of cyclohexanone, the compound $(C_2H_5)_2Sn(Cl)-O-CH(CH_3)-C_2H_5$ is obtained in an analogous manner.

p—$NC-C_6H_4-CO-CH_3$ may be reacted in an analogous manner except that the reaction is somewhat slower in this case. The course of the reaction is followed by IR spectroscopy.

EXAMPLE 13

11 g. of diethyltin dihydride and then 13 g. of acrylonitrile are allowed to flow into 26 g. of diethyltin diiodide (using 50 mg. of AIBN catalyst). The reaction is completed after 30 minutes at 20° C. After evaporation of excess acrylonitrile under vacuum, $$(C_2H_5)_2Sn(I)CH_2-CH_2-CN$$

is obtained in an amount of 43.2 g. corresponding to 95% of the theory. B.P. 102° C./0.02 mm. Hg; M.P. 35° C.; 32.7% Sn, 35.3% I; calculated, 33.1% and 35.4%, respectively.

EXAMPLE 14

13.8 g. of diisobutyltin difluoride are dissolved in 87 g. of allyl alcohol while heating and then 12 g. of diisobutyltin dihydride and 30 mg. of AIBN are added whereupon the reaction is completed within one hour at 50° C. (iso—$C_4H_9)_2Sn(F)OH_2-CH_2-CH_2-OH$ precipitates and is recovered by filtration. 29.5 g.=90% of the theory; from ethanol; decomposition point, 220° C. 37.8% Sn; calculated, 38.2% Sn.

EXAMPLE 15

To 12.2 g. of diisobutyltin dichloride and 7.2 g. of isobutyraldehyde are added dropwise 9.4 g. of di-isobutyltin dihydride. Processing by fractional distillation gives (isoC_4H_9)_2—Sn(Cl)O(isoC_4H_9). B.P. 120° C./0.5 mm. Hg; M.P. 65° C. Propionic aldehyde, n-butyric aldehyde, cyclohexyl aldehyde and n-octanal can be reacted in the same manner.

EXAMPLE 16

A mixture is prepared from 0.2 mole of $$C_6H_5-CH=N-nC_4H_9$$

and 0.2 mole of di-n-butyl-tindichloride, and 0.1 mole of di-n-butyltin-dihydride are added dropwise while thoroughly stirring. The air-sensitive $$(C_4H_9)_2Sn(Cl)-N-(CH_2-C_6H_5)C_4H_9$$

is isolated. The analogously built product is also smoothly obtained with $C_6H_5-CH=NCH_3$. Reaction of $$C_6H_5CH=N-C_6H_5$$

is also possible in this manner, but the reaction is somewhat slower and non-exothermic.

What is claimed is:

1. Process of preparing halogen containing organotin compounds which comprises reacting an organic compound containing at least one unsaturated grouping with a tin compound selected from the group consisting of organotin halide-hydride and a mixture of organotin halide and organotin hydride.

2. Process as claimed in claim 1 wherein the organo group of said tin compound is selected from the group consisting of alkyl, aryl and aralkyl.

3. Process as claimed in claim 1 wherein said reaction is carried out at a temperature up to about 50° C.

4. Process as claimed in claim 1 wherein said tin compound contains two different organo substituents.

5. Process as claimed in claim 4 wherein at least one of said organo substituents is a functional group.

6. Process as claimed in claim 4 wherein said unsaturated compound is at least one member selected from the group consisting of acrylonitrile, α-methyl styrene, hexadiene (1.5), ethylene glycol mono-allyl ether, allyl alcohol, methyl methacrylate, ethyl crotonate, phenyl acetylene, p-methoxy phenyl acetylene, cyclohexanone, methylethyl ketone, isobutyraldehyde, propionic aldehyde, n-butyraldehyde, n-octanol, cyclohexylaldehyde, benzyl n-butylimid, benzyl methylimid and benzyl phenylimid.

7. Process as claimed in claim 1 wherein the organo substituents of said tin compound is at least one member selected from the group consisting of isobutyl, ethyl phenyl, n-butyl, n-octyl, iso-octyl, methyl and ethyl.

8. Process as claimed in claim 1 carried out in the presence of a radical-forming catalyst.

9. Process as claimed in claim 8 wherein said radical-forming catalyst is at least one selected from the group consisting of azo-isobutyro-nitrile, benzylhypo nitrite, dimethyl azo-isobutyrate and diethyl azo-isobutyrate.

References Cited

Dub (I), Organometallic Compounds, vol. II (1961), p. 151, QD. 411, D9.

Dub (II), Organometallic Compounds, vol. II (1961), p. 154, QD. 411, D9.

Kuivila, Advances in Organometallic Chemistry, vol. 1, (July 6, 1964), p. 70, QD. 412–A35.

TOBIAS E. LEVOW, *Primary Examiner.*

W. F. W. BELLAMY, *Assistant Examiner.*

UNITED STATES PATENT OFFICE
CERTIFICATE OF CORRECTION

Patent No. 3,398,169                                            August 20, 1968

Wilhelm Paul Neumann et al.

It is certified that error appears in the above identified patent and that said Letters Patent are hereby corrected as shown below:

Column 1, line 3, "organotin" should read -- organic --; line 65, "RSN($X_2$)H" should read -- RSn($X_2$)H --. Column 4, line 6, "azo-bis (isobutyrodimethyl ester)" should read -- azo-bis(isobutyric acid methyl ester) --

Signed and sealed this 31st day of March 1970.

(SEAL)
Attest:

Edward M. Fletcher, Jr.                          WILLIAM E. SCHUYLER, JR.
Attesting Officer                                          Commissioner of Patents